(12) United States Patent
Coon

(10) Patent No.: US 6,445,546 B1
(45) Date of Patent: Sep. 3, 2002

(54) SNAP-IN ASSEMBLY OF SUSPENSION LIMITER HAVING BOTH HIGH SHOCK AND LOAD/UNLOAD CYCLE CAPABILITY

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 09/941,449

(22) Filed: Aug. 28, 2001

Related U.S. Application Data

(63) Continuation of application No. 09/300,619, filed on Apr. 27, 1999, now Pat. No. 6,320,729.
(60) Provisional application No. 60/125,918, filed on Mar. 24, 1999.

(51) Int. Cl.[7] .............................................. G11B 21/16
(52) U.S. Cl. ................................................... 360/245.7
(58) Field of Search ........................... 360/245.7, 245.1, 360/245.3–245.5

(56) References Cited

U.S. PATENT DOCUMENTS

| 5,771,136 A | * | 6/1998 | Girard ...................... 360/245.7 |
| 5,987,733 A | * | 11/1999 | Goss ........................ 360/245.7 |
| 6,028,741 A | * | 2/2000 | Kazama .................... 360/245.7 |
| 6,067,209 A | * | 5/2000 | Aoyagi et al. ............ 360/245.7 |
| 6,137,657 A | * | 10/2000 | Coon et al. ............... 360/245.7 |
| 6,172,853 B1 | * | 1/2001 | Davis et al. .............. 360/245.7 |
| 6,233,121 B1 | * | 5/2001 | Pan ........................... 360/245.7 |
| 6,243,235 B1 | * | 6/2001 | Fu et al. ................... 360/245.7 |
| 6,327,118 B1 | * | 12/2001 | Perez ....................... 360/245.7 |

* cited by examiner

*Primary Examiner*—Allen Cao
(74) *Attorney, Agent, or Firm*—Louis J. Bachand

(57) ABSTRACT

Disk drive suspensions having limiters with both high shock and load/unload capability are readily assembled by deflecting a normally upstanding tab on the flexure tongue into a slot on the load beam, or vice-versa, where it irreversibly engages the load beam upon returning to its upright condition.

31 Claims, 9 Drawing Sheets

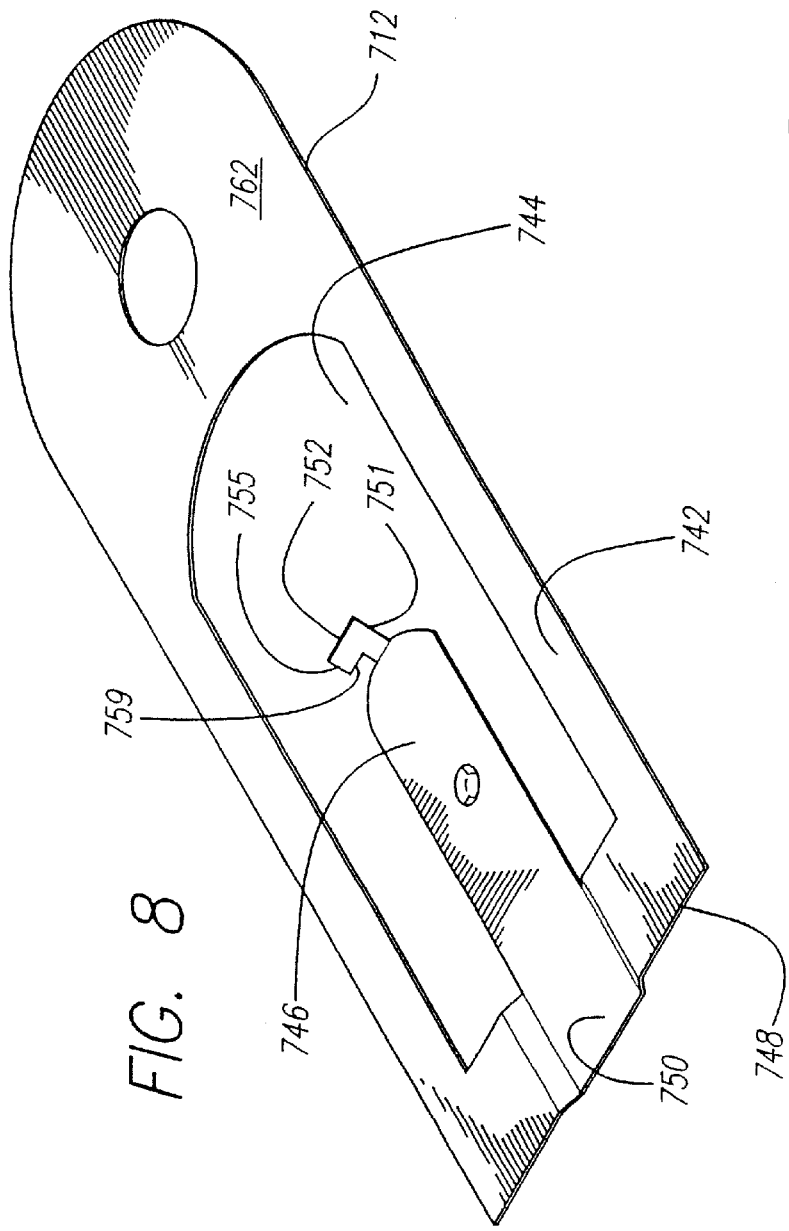
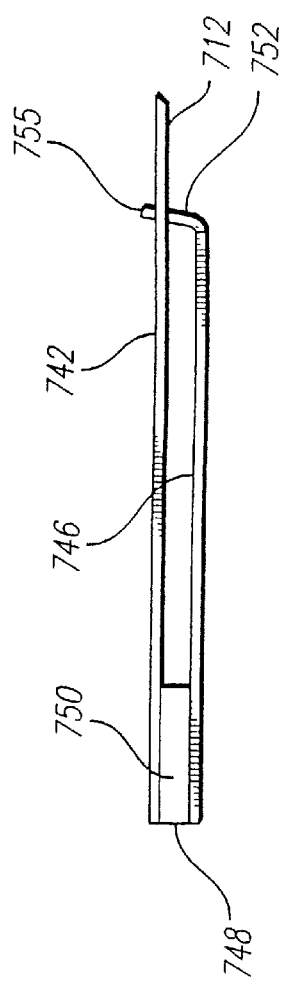

they cannot do the cost if the machine fails to keep up with the operator cannot keep up with the machine.

SNAP-IN ASSEMBLY OF SUSPENSION LIMITER HAVING BOTH HIGH SHOCK AND LOAD/UNLOAD CYCLE CAPABILITY

REFERENCE TO RELATED APPLICATIONS

This application is a continuation of U.S. patent application, Ser. No. 09/300,619, filed Apr. 27, 1999 U.S. Pat. No. 6,320,729 B1, and further claims the benefit of U.S. Provisional Application, Serial No. 60/125,918, filed Mar. 24, 1999.

BACKGROUND OF THE INVENTION

1. Field of the Invention

This invention relates to disk drive suspensions comprising load beams and flexures in which the flexure tongue is limited in its travel by a limiter structure. More particularly, the invention relates to the snap-in connection of the flexure tongue-borne limiter structure to the load beam in a movement requiring only the pressing together of the load beam and flexure. Relative longitudinal movement of the flexure or flexure tongue and the load beam, usually required with flexure tongue-borne limiter structures that insert into the load beam with a longitudinal axial movement, is obviated, with resultant increased production rates and reduced incidence of defects.

In the invention, a snap-fit disk drive suspension assembly is provided comprising a load beam having a slot and secured to the load beam a flexure having a cantilevered tongue opposing the load beam and adapted to carry a slider. The invention structure is suitably formed on the tongue and sized to limit excursions of the tongue relative to the load beam. The limiter structure comprises a normally upright, resilient tab offset from a cooperating slot. The tab, typically carried by the flexure is similarly resilient so as to be deflectable bodily by the load beam in which the cooperating slot is formed until the slot registers with the tab. The limiter tab thus snaps into the slot in a deflected condition and immediately returns to an upright condition thereby engaging the tab with the load beam at the slot edge margin. The so-fixed limiter structure thus limits the flexure tongue excursions, is placed in position without relative longitudinal axial displacement of the load beam and flexure, and once so snapped into place is engaged there permanently.

2. Related Art

Limiter structures or more simply limiters are mechanical devices that block unwanted movement of a flexure tongue as it carries the suspension slider, usually by blocking undue movement with a structure supported by the flexure, the load beam or both. Workers in the art of limiter structures have attempted to meet progressively more difficult requirements for advanced disk drive suspensions. Initially, the main criterion was shock resistance, then load/unload capability became important. In a suspension shock resistance is the ability of the suspension to limit the angular stroke and/or the displacement of the flexure relative to the load beam so that the slider does not damage the disk when the lift off shock threshold is surpassed. In cases where the slider design permits, in the simplest terms, this means that the suspension does not allow the slider to lift off the disk, thus controlling the slider movement directly. But, as the shock threshold requirement increases, the slider will eventually be lifted off the disk during a shock event. Thus, the problem becomes one of controlling the slider motion during the time the slider is no longer in contact with the disk. In this context, non-contact of the slider with the disk refers to the slider being more than a few times farther separated from the disk than it is in the steady-state flying condition. During flying, the slider may be from less than one microinch to several microinches from the disk; this is considered to be in contact. Not in contact is a separation of 100 microinches or more, possibly up to a few thousandths of an inch.

During the time the slider is not in disk contact, the slider motion is slightly restrained by the action of the flexure and the load beam acting on the mass of the slider. Since, however, the slider is greatly energized by a shock event, the soft flexure and load beam springing is unable to completely control the slider motion.

In load and unload cycles, the load beam and flexure are further used in a reverse role, i.e. to pull the slider away from the disk instead of holding it against the disk.

The two requirements of shock resistance and load/unload cycling have been addressed in a variety of load beam and flexure designs, e.g. U.S. Pat. No. 5,771,136; U.S. Pat. No. 5,526,205; and U.S. Pat. No. 5,570,249. In general, the prior art has emphasized solving either the shock problem or the load/unload cycle. Where shock resistance is the primary consideration, limiters have been proposed that contact the flexure near the center of mass of the slider, or if that is not possible, contacts the flexure on both left and right sides on a transverse line that crosses through the center of mass of the slider or near to it. Where load/unload cycling is the primary consideration, the preferred location of the limiter is near the leading edge of the slider because then the limiter restricts the ability of the nose to drop to far below the correct attitude, and this ensures that the slider will load and unload in the nose-up (leading edge-up) condition.

SUMMARY OF THE INVENTION

A difficulty with both prior art designs that give primacy to shock resistance and those that give primacy to load/unload cycling is the excessive cost of executing the design in a production environment relative to the benefit gained. Cost elements include the cost of the material to create the feature, the labor required, and the reduced yield realized if the feature has a yield impact. In the design of flexure limiters, many apparently effective designs require an interleaving of the flexure and load beam at the welding-fixture-loading step of the manufacturing process. That is, the interfitting male and female parts must be shifted, usually on their longitudinal axes, for there to be interfittment and engagement. This interfittment, given the tiny parts and the barely visible, even with magnification, zone of interfittment implicates serious labor cost increases and, because of the difficulty involved in the process, significant yield cost impact.

Thus, manufacturing engineers must take into account the small, e.g. thumbnail, size of the parts involved, the typical availability of both the load beam and the flexure only on separate frets of 5 to 10 pieces per fret, and bulkiness of the fixture that prevents the operator from readily using a microscope to aid the operator in correctly loading and interleaving these tiny parts. In the event of misloaded or misinterleaved parts, the limiter feature is not assembled correctly or it may be damaged during assembly. In either case there is an impact on device yield.

In a manufacturing cycle paced by the required welding time, the operator usually has forty seconds to load fixtures with twenty assemblies of three components each to keep up with the laser welding machine. A limiter product design that requires the operator to slow down to load correctly is more expensive to produce because the operator cannot keep up with the machine. The presence of these manufacturing problems generally typifies the devices of the above and like patented devices.

It is an object therefore, to provide an improved limiter in a disk drive assembly. It is another object to provide a disk drive suspension that is readily assembled, including interengaged limiter.

It is a particular object to assemble a disk drive suspension load beam and flexure by merely pressing together of the load beam and flexure wherein their relatively offset, but cooperating tab and slot structure defines the limiter.

Further objects include forming a flexure or load beam having a normally upright, resilient limiter structure that is deflectable, forming then thew load beam or flexure to a limiter structure receiving slot that is offset from the normally upright limiter structure, but that receives the limiter structure upon deflection of the structure as by the load beam closing on the flexure, the slot offset causing the received limiter structure to engage the slot edge margin when upright, or nondeflected, the resilience of the limiter structure enabling a snap-back of the limiter structure to its normal upright orientation, in which orientation the limiter structure cannot escape the slot.

Specifically, the limiter structure. typically comprises a flexure tongue-carried tab that will enter the load beam slot in a deflected condition, but return to an undeflected condition once the force of the load beam on the tab is relieved by the tab being into the slot. In the undeflected or upright condition the load beam slot continues offset relative to the tab, but the tab is now in a portion of the slot that enables the return of the tab to its upright, undeflected position. The tab and slot shapes are complementary to form a hooked engagement when the tab is upright within the slot. There is no interleaving by relative longitudinal shifting of the parts, rather the parts interfit when the tab and slot coincide, and the relative shapes preclude separation once interfitted.

The invention thus provides a limiter design that engages in a one-way action; it snaps together. By providing tabs on the flexure that snap over mating surfaces on the load beam, or vice versa, a disk drive configuration is realized that is top-loadable. That is, the unassembled parts are loaded vertically in sequence onto a weld fixture with out interleaving, and then guided into position with guide pins as is done with a suspension assembly that does not have a limiter feature. The difference is that with this invention, the parts can be simultaneously provided with a limiter structure with no assembly complications, as the limiter tabs will find the slots as the vertical stack is pressed together.

Accordingly, the invention provides a snap-fit disk drive suspension comprising a load beam and secured to the load beam a flexure having a cantilevered tongue opposing the load beam and adapted to carry a slider, a limiter comprising a cooperating slot and tab structure defined by said flexure tongue and load beam to limit excursions of the tongue relative to the load beam, the limiter comprising a normally upright, resilient tab offset from the slot and adapted to snap into the slot in tongue excursion limiting relation without relative axial displacement of the load beam and flexure.

In this and like embodiments, typically the tab is normally generally upright, the tab being resiliently deflectable to be received in the slot and return to the generally upright condition upon being received in the slot, the resilient tab in its upright condition is offset from said slot, said slot being arranged to receive said tab in its deflected condition and to retain said tab in its normal upright condition when engaged with the opposing load beam, the load beam slot being offset from the tab in its upright condition, the slot being arranged to receive the tab in its deflected condition and to retain the tab in its normal upright condition, the tab resiliently returning to its the upright condition upon being received in the slot, whereby excursions of the tongue from the load beam are limited by the engagement of the tab with the load beam, the tongue defines the tab and the load beam defines the slot, the tab being sufficiently resilient to snap to its upright condition upon reception in the load beam slot, or the tongue defines a plurality of the tabs, with the load beam defining a slot for each tab.

In a further embodiment, the invention provides a snap-fit disk drive suspension comprising a load beam and a flexure, the flexure having a tongue, the flexure tongue being limited to a predetermined travel excursion relative to the load beam by a normally upright limiter structure disposed at an angle of about 68 to 88 degrees relative to the flexure, the limiter structure having an inner end fixed to the flexure and a free outer end deflectable laterally relative to the inner end between undeflected and deflected conditions, the load beam having an opening offset from the limiter structure inner end and arranged to pass the limiter structure outer end through the load beam in its deflected but not its undeflected condition, the load beam opening having a surrounding edge margin, the limiter structure being resilient to return to its the undeflected condition upon passage of its the outer end through the load beam opening, the limiter structure outer end being shaped to engage the load beam opening edge margin in the undeflected condition of the limiter structure outer end responsive to the predetermined travel excursion of the flexure tongue.

In this and like embodiments, typically, the load beam and flexure each comprise a spring steel, the flexure, flexure tongue and limiter structure are integrally formed with each other from a common piece of spring steel, the flexure tongue defines a pair of limiter structures, the load beam defining a pair of the openings respectively offset from the limiter structures inner ends and arranged to receive the pair of limiter structures in flexure tongue travel excursion limiting relation, the flexure tongue has a proximate end fixed to the flexure and a free distal end, the limiter structure being fixed to the flexure tongue between its the proximate and distal ends, the flexure tongue defines a pair of the limiter structures, the load beam defines a pair of the openings, and the limiter structures are fixed to the flexure tongue intermediate its the proximate and distal ends, the limiter structures in the pair are laterally opposed across a portion of the flexure tongue intermediate its the proximate and distal ends, the flexure tongue has a proximate end fixed to the flexure and a free distal end, the limiter structure being fixed to the flexure tongue at its the distal end, the load beam defining the offset opening relative to distal end fixed limiter structure, the flexure tongue further defines intermediate its proximate and distal ends a pair of limiter structures, the load beam defining a pair of further openings offset relative to the pair of limiter structures for passage of the pair of the limiter structures only in their deflected condition and engagement only in their undeflected condition, and the distal end limiter structure is a first limiter structure, the intermediate limiter structures are second and third limiter structures and in which the flexure tongue further defines at its the proximate end a fourth limiter structure, the load beam defining a further opening offset relative to the fourth limiter structure for passage of the fourth limiter structure only in its deflected condition.

In a further embodiment, the invention provides a snap-fit disk drive suspension comprising axially aligned a load beam and a flexure having a frame attached to the load beam, the flexure having a tongue extending centrally of the frame in load beam attachment free relation, the flexure tongue being limited to a predetermined travel excursion relative to the load beam by a limiter structure having an inner end fixed to the flexure and a free outer end deflectable laterally relative to the inner end between undeflected and deflected conditions, the load beam having an opening offset from the limiter structure inner end, the load beam opening having a surrounding edge margin, the limiter structure resiliently returning to its the undeflected condition upon passage of its the outer end through the load beam opening, the limiter structure outer end being generally hook-shaped to pass the load beam opening in the deflected condition of the limiter structure outer end and to engage the load beam edge margin in the undeflected condition of the limiter structure outer end responsive to the predetermined travel excursion of the flexure tongue.

In yet another embodiment, the invention provides a snap-fit disk drive suspension comprising a load beam and a flexure having a flexure tongue, the flexure tongue having left and right edges and defining a laterally opposed pair of left and right limiter structures extending along the flexure tongue edges generally in parallel with the longitudinal axis of the flexure tongue and adapted to be sprung outward from the flexure tongue edges responsive to bodily contact with the load beam, the load beam defining a pair of the openings respectively offset laterally outward from the limiter structures inner ends and arranged to receive the pair of limiter structures outwardly sprung and to permit return of the outer ends to their undeflected condition in flexure tongue travel excursion limiting relation.

In this and like embodiments, typically, the flexure tongue has a proximate end fixed to the flexure and a distal end free of connection to the flexure, the pair of limiter structures being fixed to the flexure tongue right and left edges intermediate its the proximate and distal ends, the flexure tongue has a proximate end fixed to the flexure frame and a distal end free of connection to the flexure frame, the limiter structure being fixed to the flexure tongue at its the distal end, the load beam defining the offset opening relative to distal end fixed limiter structure, the flexure tongue further defines intermediate its proximate and distal ends a pair of limiter structures, the load beam defining a pair of further openings offset relative to the pair of limiter structures for passage of the pair of the limiter structures only in their deflected condition, and the distal end limiter structure is a first limiter structure, the intermediate limiter structures are second and third limiter structures and in which the flexure tongue further defines at its the proximate end a fourth the limiter structure, the load beam defining a further opening offset relative to the fourth limiter structure for passage of the fourth limiter structure only in its deflected condition.

In a further embodiment, the invention provides a flexure for a disk drive suspension comprising a frame and a cantilevered tongue, the tongue defining a normally upright, resilient tab extending at an angle of between 68 and 88 degrees relative to the flexure tongue and having a hook-shaped free end, the tab being adapted to snap-fit into an offset opening in an opposing load beam and return to its the upright condition in tongue travel limiting relation relative to the frame.

In this and like embodiments, typically, the tab is sized to extend through the load beam opening, the tab hook-shaped free end being sized to overlie in the tab upright condition an edge margin of the load beam opening in flexure excursion limiting relation.

In its method aspects the invention contemplates the method of assembling a suspension including juxtaposing a load beam and a flexure comprising a frame and tongue, carrying on the flexure tongue a limiter having an inner end attached to the flexure tongue and an outer end spaced from the inner end at a distance giving the limiter a predefined height, forming on the limiter outer end an enlarged head having a laterally extended portion to one side and having an inner edge opposed to the load beam, maintaining the limiter in a normally upright position at a predetermined angular orientation between 68 and 88 degrees, and preferably about 78 degrees, relative to the flexure tongue, defining a limiter enlarged head-passing opening in the load beam out of registration with the limiter in its the predetermined angular orientation and of a shape in the plane of the load beam generally congruent with the limiter enlarged head and laterally extended to one side, pressing the flexure and the load beam together at a spacing less than the limiter predefined height, deflecting the limiter from its predetermined angular orientation to a smaller angle relative to the flexure tongue, passing the limiter enlarged head through the load beam at the load beam opening and returning the tab to its normal upright position to selectively hook the limiter laterally extended portion with the edge margin of the load beam opening laterally extended portion in response to travel of the flexure tongue.

BRIEF DESCRIPTION OF THE DRAWINGS

The invention will be further described in conjunction with the attached drawings, in which:

FIG. 8 is an isometric view of the invention flexure shown in FIG. 7;

FIG. 9 is a side elevation view of the invention flexure in FIG. 8; and,

DETAILED DESCRIPTION

Figure 1:
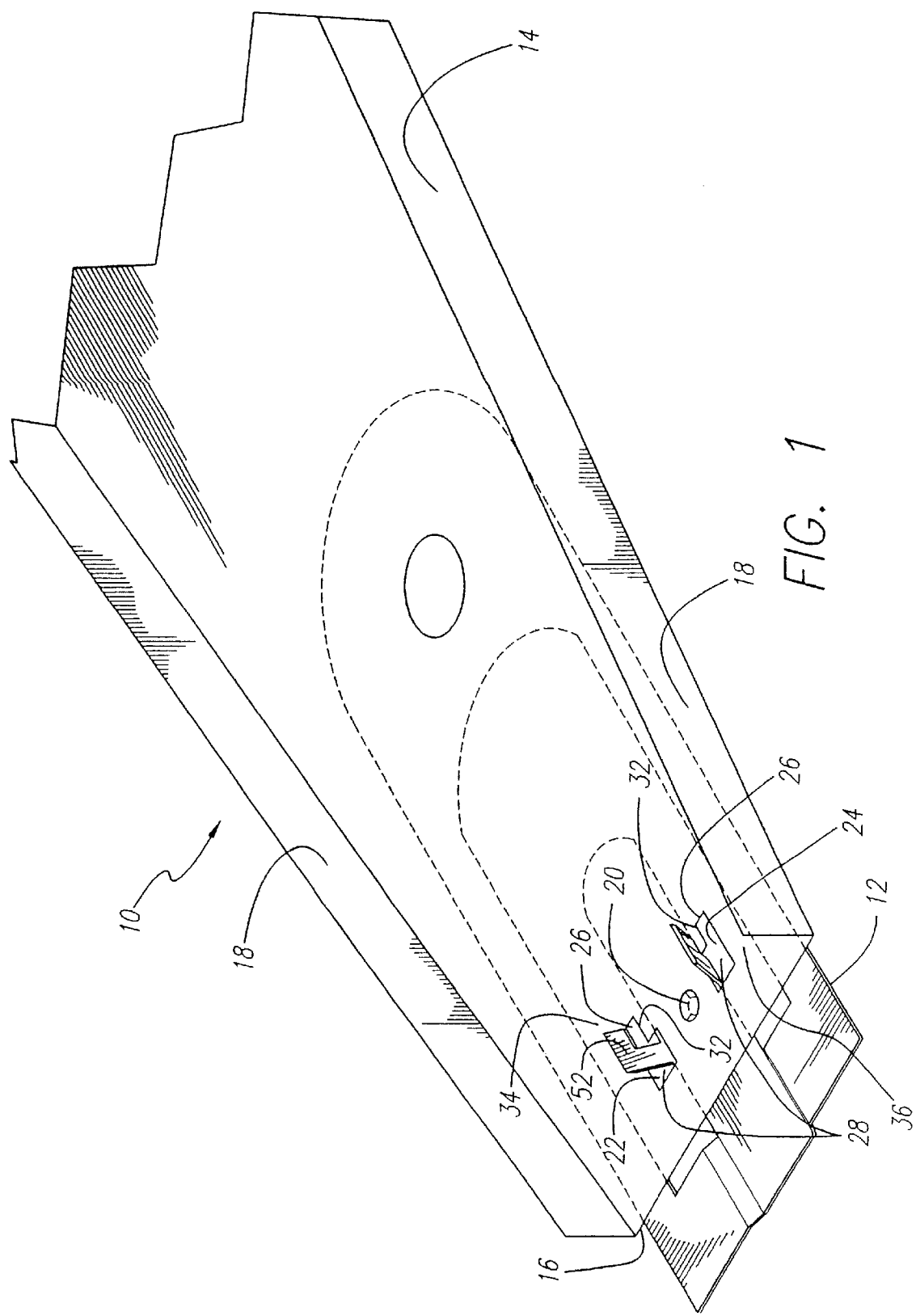
FIG. 1 is an isometric view of the invention disk drive suspension.
Figure 4:
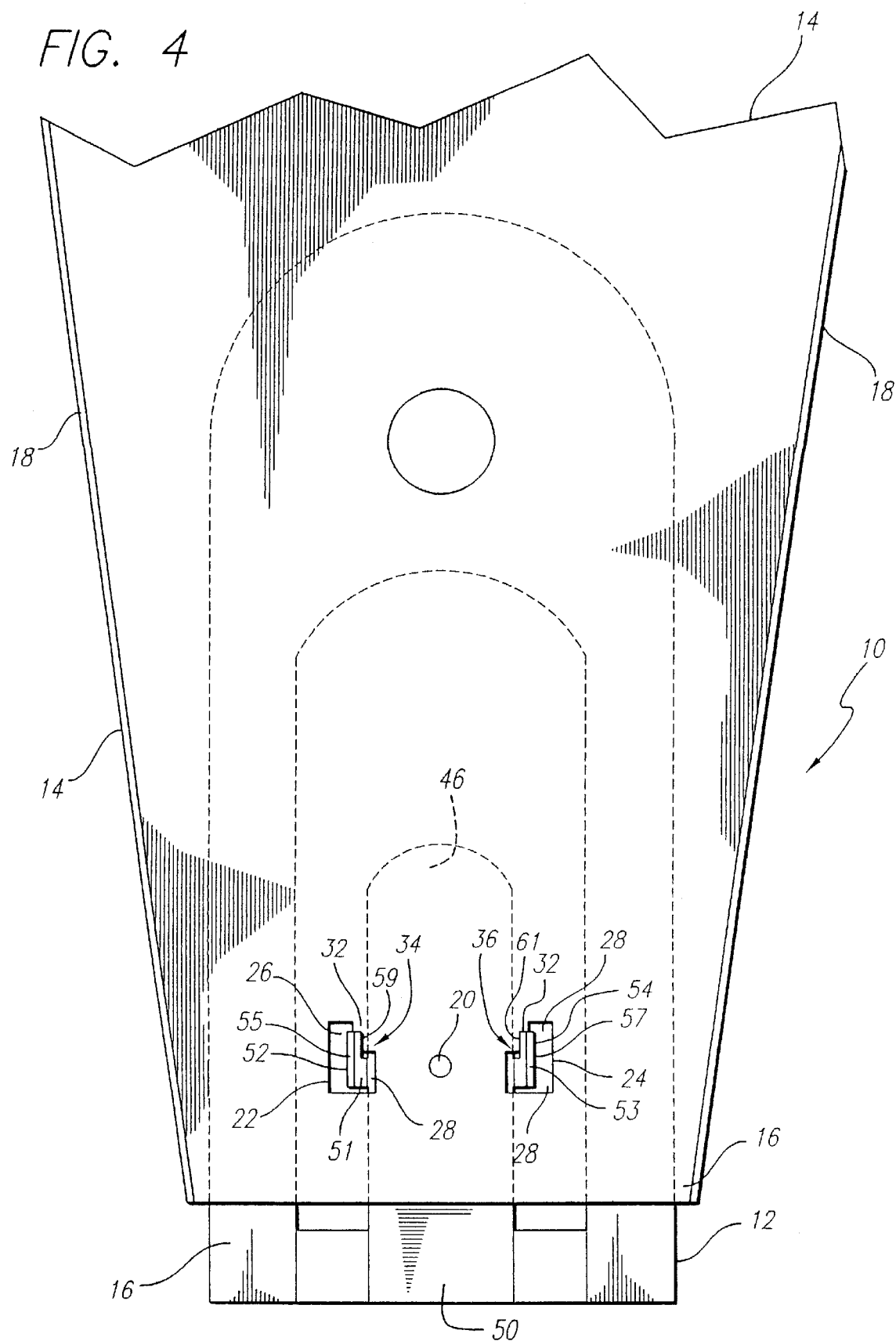
FIG. 4 is a view of the invention flexure assembled with a load beam.

Now with reference to the drawings in detail, FIGS. 1 and 4 show the invention disk drive suspension assembly 10 to include a flexure 12 and a load beam 14, vertically stacked and juxtaposed with their respective longitudinal axes aligned. Load beam 14 is generally conventional having an elongated shape tapered toward its distal end 16, edge rails 18 and dimple 20. In FIG. 1 the load beam 14 is shown to have a pair of left and right hand tab-receiving slots 22, 24. Slots 22, 24 are each keyhole-shaped to have an elongated narrow portion 26 and a laterally widened portion 28 communicating with the narrow portion. The disparity in widths between the narrow and widened portions 26, 28 defines a land 32 as part of the edge margins 34, 36 surrounding the slots 22, 24.

Figure 2:
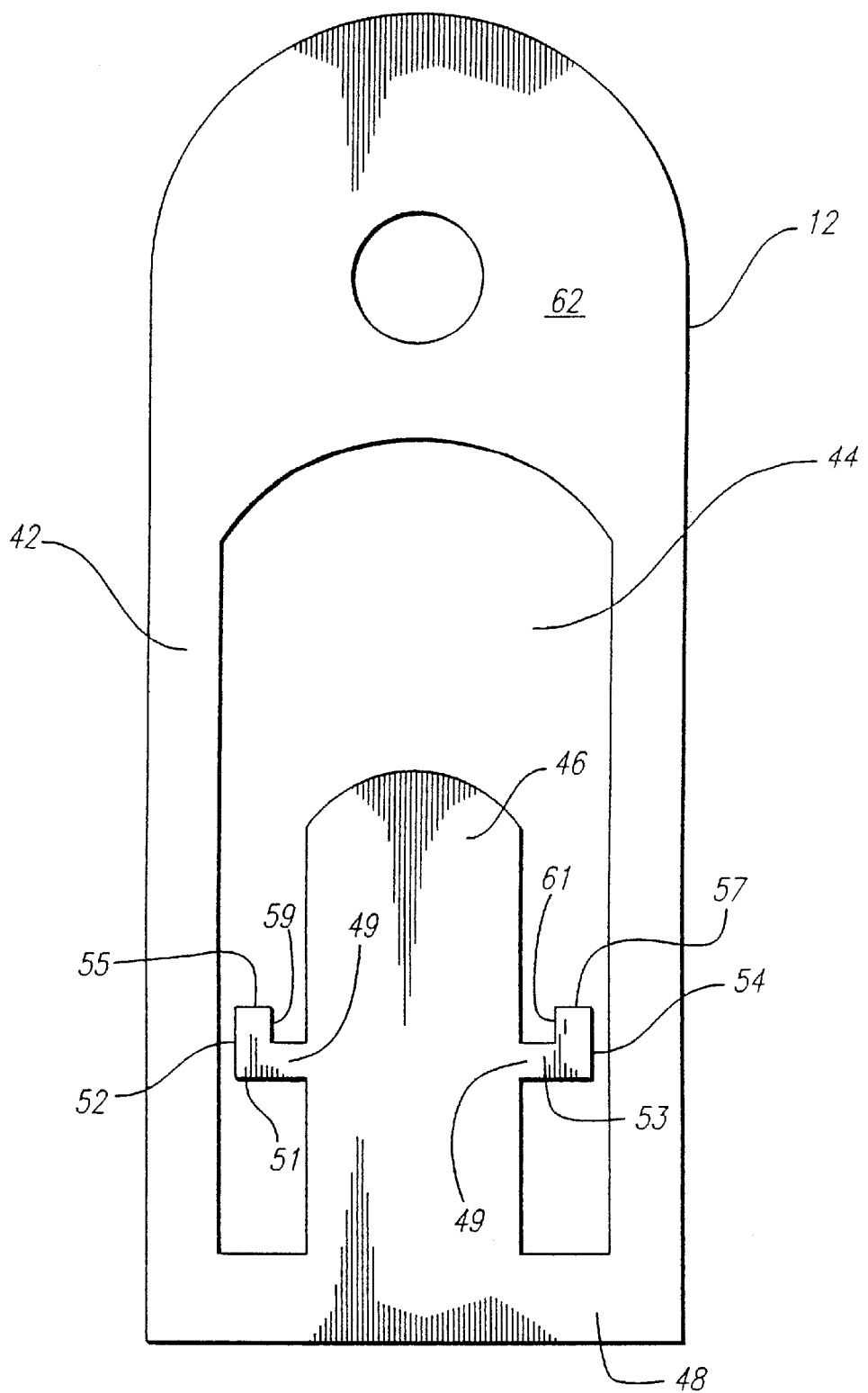
FIG. 2 is a plan view a flexure in the flat according to the invention.
Figure 3A:
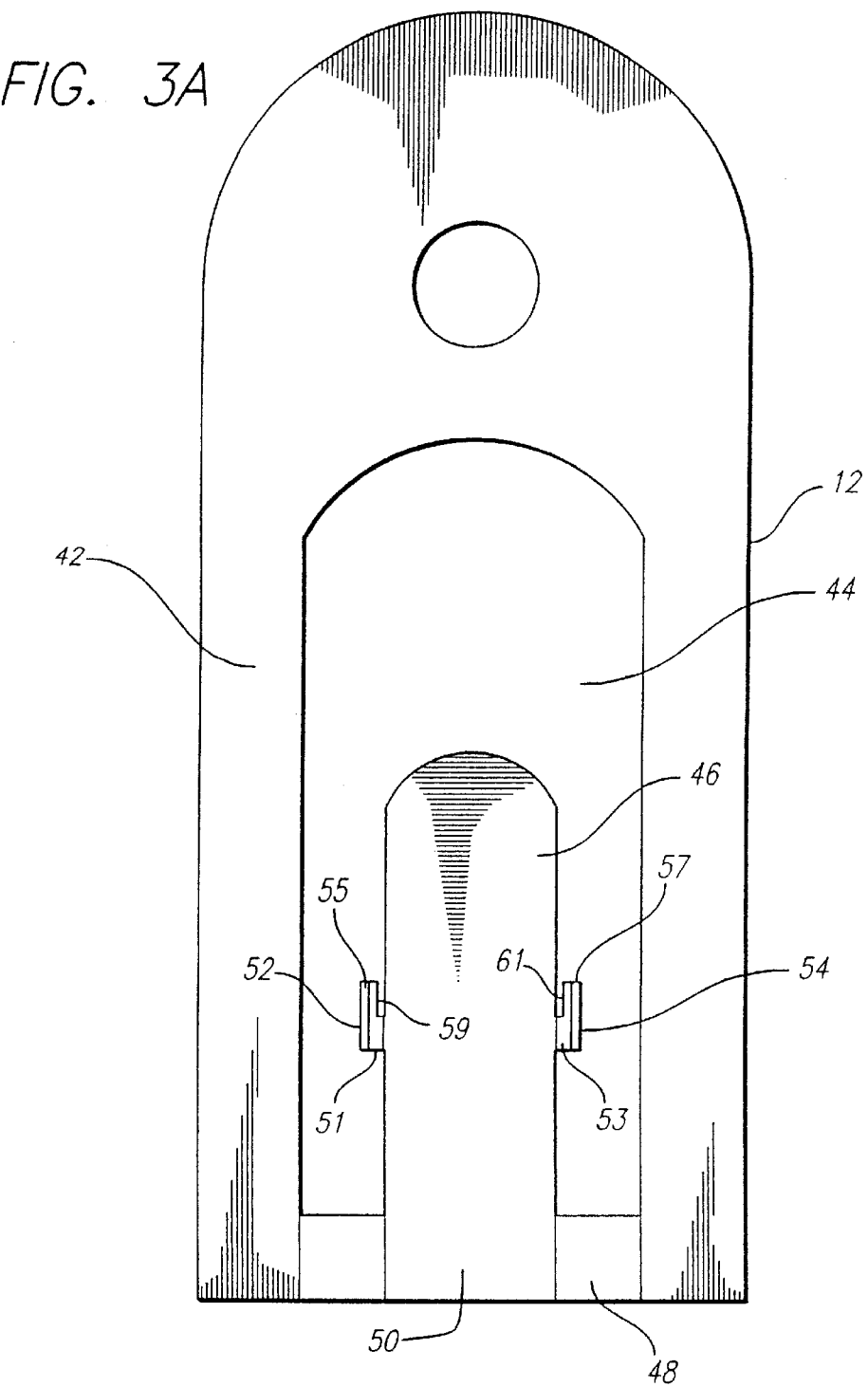
FIG. 3A is a plan view of the invention flexure, the tabs having been bent upward.
Figure 3B:
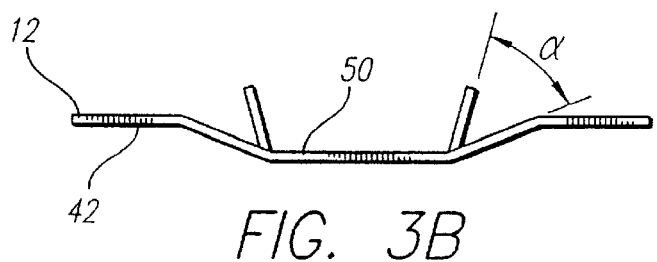
FIG. 3B is an end elevation view of the invention flexure shown in FIG. 3A.

With additional reference to FIGS. 2, 3A and 3B, the flexure 12, formed suitably by etching, has an elongated shaped frame 42, centrally open at 44, and a tongue 46 cantilevered in the central opening from flexure cross member 48, specifically at the cross member central deflection 50. In FIG. 2, the flat form of the flexure 12 is shown, as just after etching and before folding up the tabs 52, 54. In the embodiment shown, the tabs 52, 54 are formed as part of the tongue rather than as part of the load beam. The tabs 52, 54 are generally hook-shaped to have elongated narrow or neck portions 51, 53, and head portions 55, 57, the head portions having engaging edges 59, 61, for purposes to appear. Thus, the flexure tongue 46 defines as one part of the invention limiter structure the left and right hand key-shaped tabs 52, 54. The shape of tabs 52, 54 is congruent with the shape of slots 22, 24, with the tabs being somewhat undersized to better interfit with the slots. These tabs 52, 54 alternatively can be formed on the load beam 12, in which case the slots 22, 24 will be formed on the tongue.

In fabricating the flexure 12 according to the invention after an initial etching to the shape shown in FIG. 2, the tabs 52, 54 are bent to an upstanding orientation, typically standing normal to the general plane of the flexure and to the specific plane of the flexure frame 42, see FIGS. 3A, 3B, so as to be able to enter into slots 22, 24. The tabs 52, 54, being formed of the same spring steel as the flexure, are resilient and deflectable; the tabs are formed to project at an angle ∀ to the plane of the flexure frame of about 78 degrees, or more broadly to between about 68 and 88 degrees to the flexure frame plane, such that pressing the flexure 12 to the load beam 14 will deflect the tabs to a lesser angle –∀ as the load beam and flexure close on each other as shown in e.g. FIG. 5C.

Figure 5A:
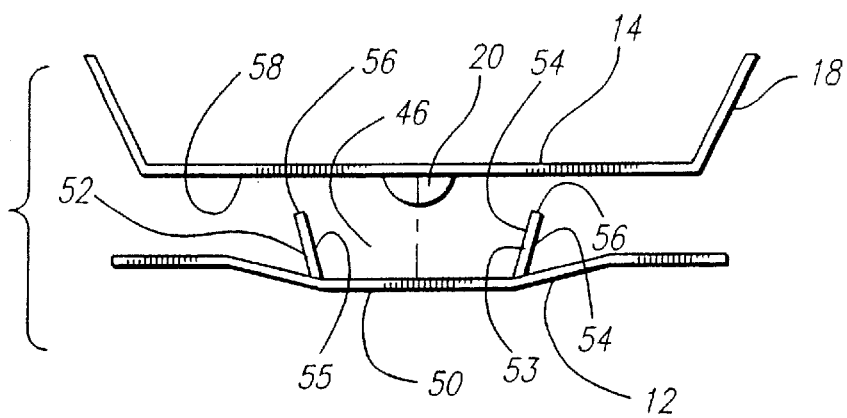
FIGS. 5A to 5E illustrate in end elevation views the steps in the assembly of the invention flexure and load beam together.
Figure 5B:
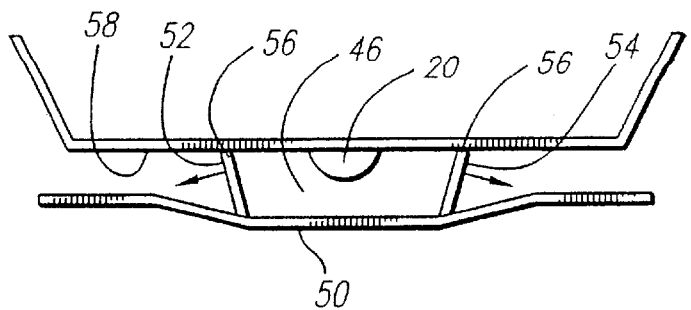
Figure 5C:
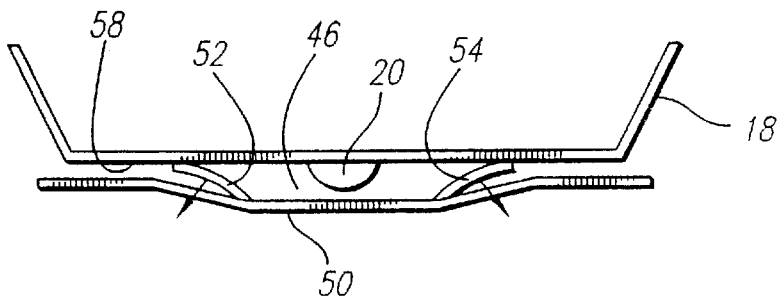
Figure 5D:
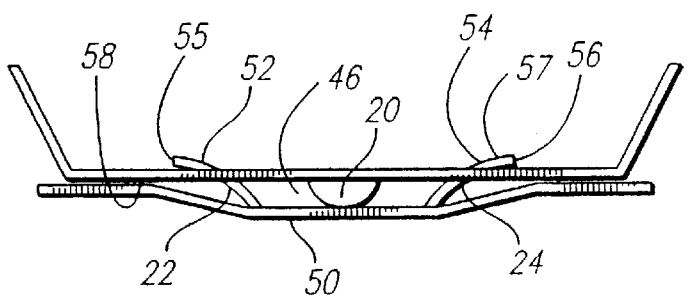
Figure 5E:
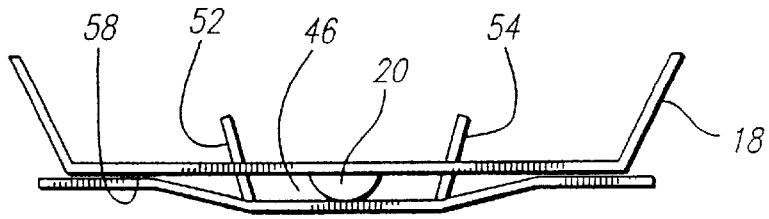
Figure 6A:
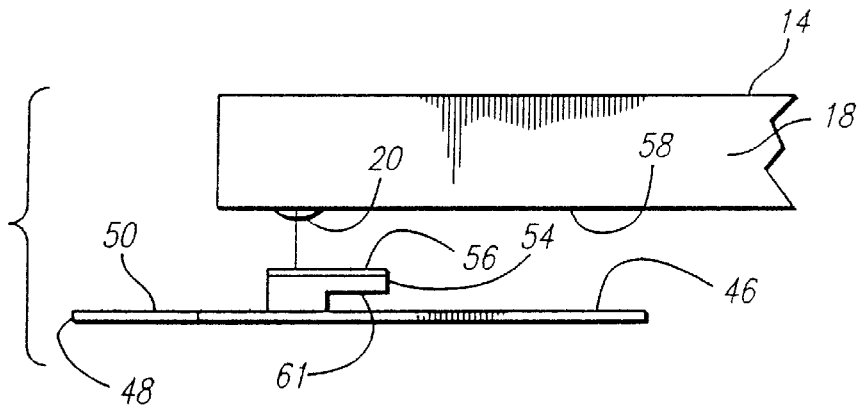
FIGS. 6A to 6E illustrate in side elevation views the steps in the assembly of the invention flexure and loads beam together.

With reference to FIGS. 5A to 5E, and to FIGS. 6A to 6E, the juxtaposed flexure 12 and load beam 14 of FIG. 5A and 6a are brought together with the tabs 52, 54, vertically oriented and slots 22, 24 in the load beam 14 horizontally oriented. The tabs 52, 54 and the slots 22, 24 are offset, that is the slots are laterally outside the tabs such that the tabs, vertically upstanding, cannot enter the slots. When the tabs 52, 54 are deflected outward, however, they eventually register with the slots 22, 24. Thus registered, the tabs 52, 54 will enter the slots 22, 24.

Before continuing with the apparatus description, it is well to note that the described vertical orientation of the tabs 52, 54 when applied to each flexure in a series of flexures juxtaposed in a stack with opposing load beams makes possible the assembly of a series of load beams and flexures by compressing the stack. The assembly occurs automatically by virtue of the snap-in feature of the invention. In conventional limiter systems, the several pairs of flexures and load beams cannot be joined with their limiters engaged in the same vertical stack alignment as is used to connect the flexures and load beams. The motion required for such assembly in the prior art is relative longitudinal or lateral shifting as the parts are interleaved. In the present invention, the motion needed to engage the limiter structures is vertical and consistent with other assembly operations.

Figure 6B:
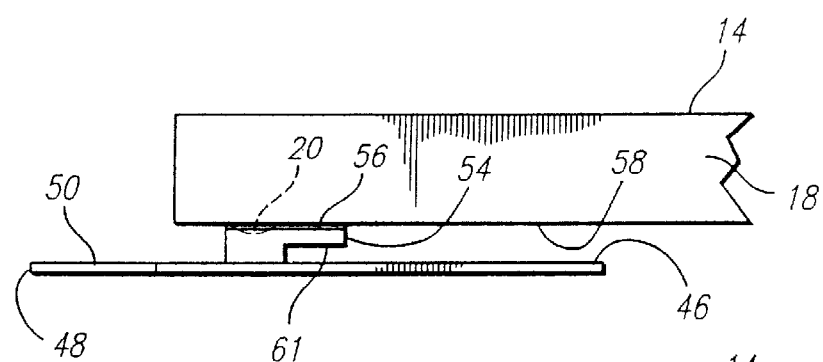
Figure 6C:
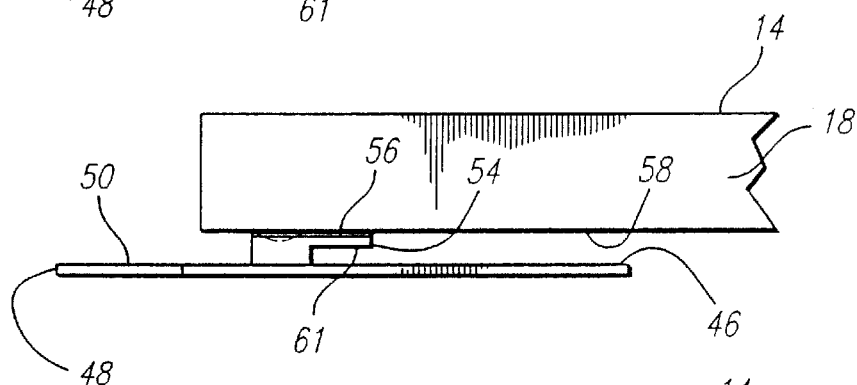
Figure 6D:
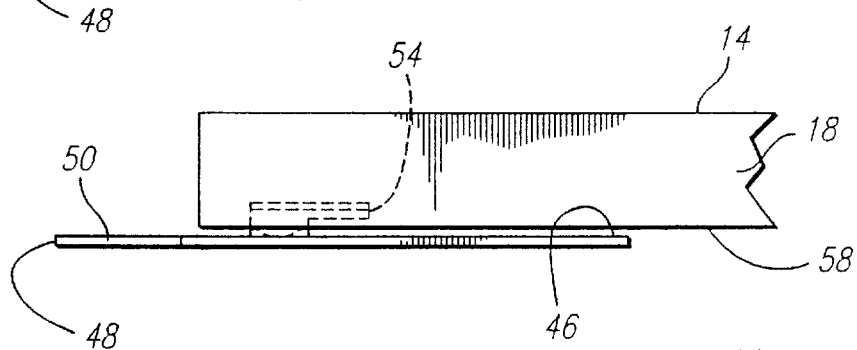
Figure 6E:
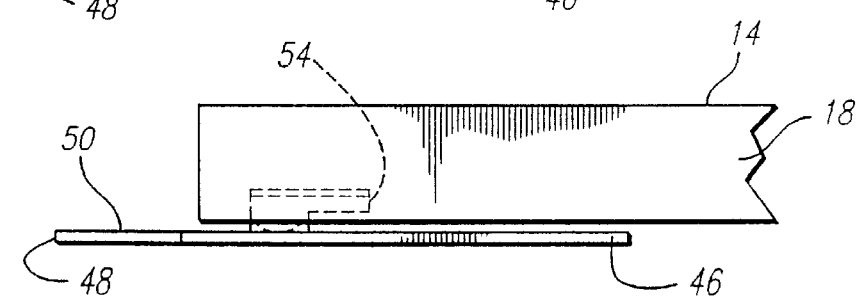

Referring now to FIGS. 5B and 6B, there the preliminary engagement of the tabs 52, 54 with the load beam is shown; this contact is between the upper edge 56 of the tabs and the load beam undersurface 58. In FIGS. 5C and 6C the initial deflection laterally outward of the tabs 52, 54 is shown. This deflection continues as the opposed parts continue to approach each other. At a point in this progressive deflection, the key-shaped tabs 52, 54, register with the keyhole shaped slots 22, 24 and snap into the slots in response to their springy deflection. As shown in FIGS. 5D and 6D, the tabs 52, 54 interfit the slots 22, 24. Then, because of the resilience of the tabs 52, 54, these tabs return to their normal, upright condition, e.g. ∀ equals about 78 degrees from the outwardly, laterally extending horizontal plane P that includes the flexure wall 62. This upright condition is shown in FIGS. 5E and 6E.

In FIG. 4, the snapped-together load beam 14 and flexure 12 are depicted with the tabs 52, 54 inserted in place in the slots 22, 24. Note that the tab neck portions 51, 53 extend through the slots 22, 24, and the tab head portions 55, 57 after passing the slots's widened portions 26, 28 snap over to their normal orientation, in which their engaging edges 59, 61 engage the respective lands 32 of the slots 22, 24 edge margins 34, 36. In this positioning, the engaging edges 59, 61 will engage the lands 32 and block undue excursions of the flexure tongue 46.

Figure 7:
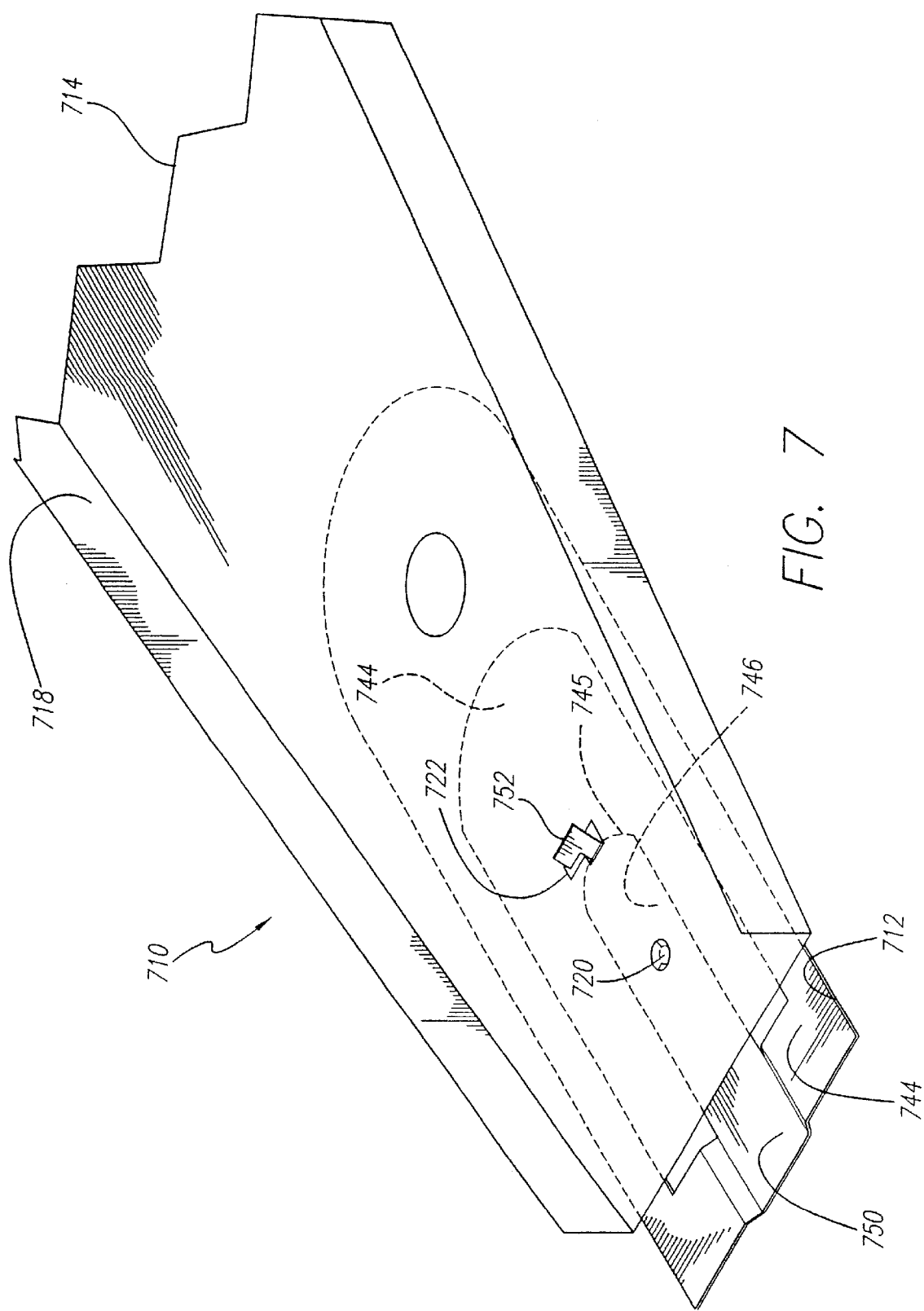
FIG. 7 is a view like FIG. 1 of a further embodiment of the invention.

In FIGS. 7, 8 and 9, in which like parts have like numerals to the earlier Figures plus 700, tab 752 is configured like tab 52, but is located on the extreme distal end 745 of the tongue 746 of flexure 712. There it intersects with slot 722 formed in the load beam 714. Configuration and operation of tab 752 in slot 722 is the same as described above for tab 52 and slot 22.

Figure 10:
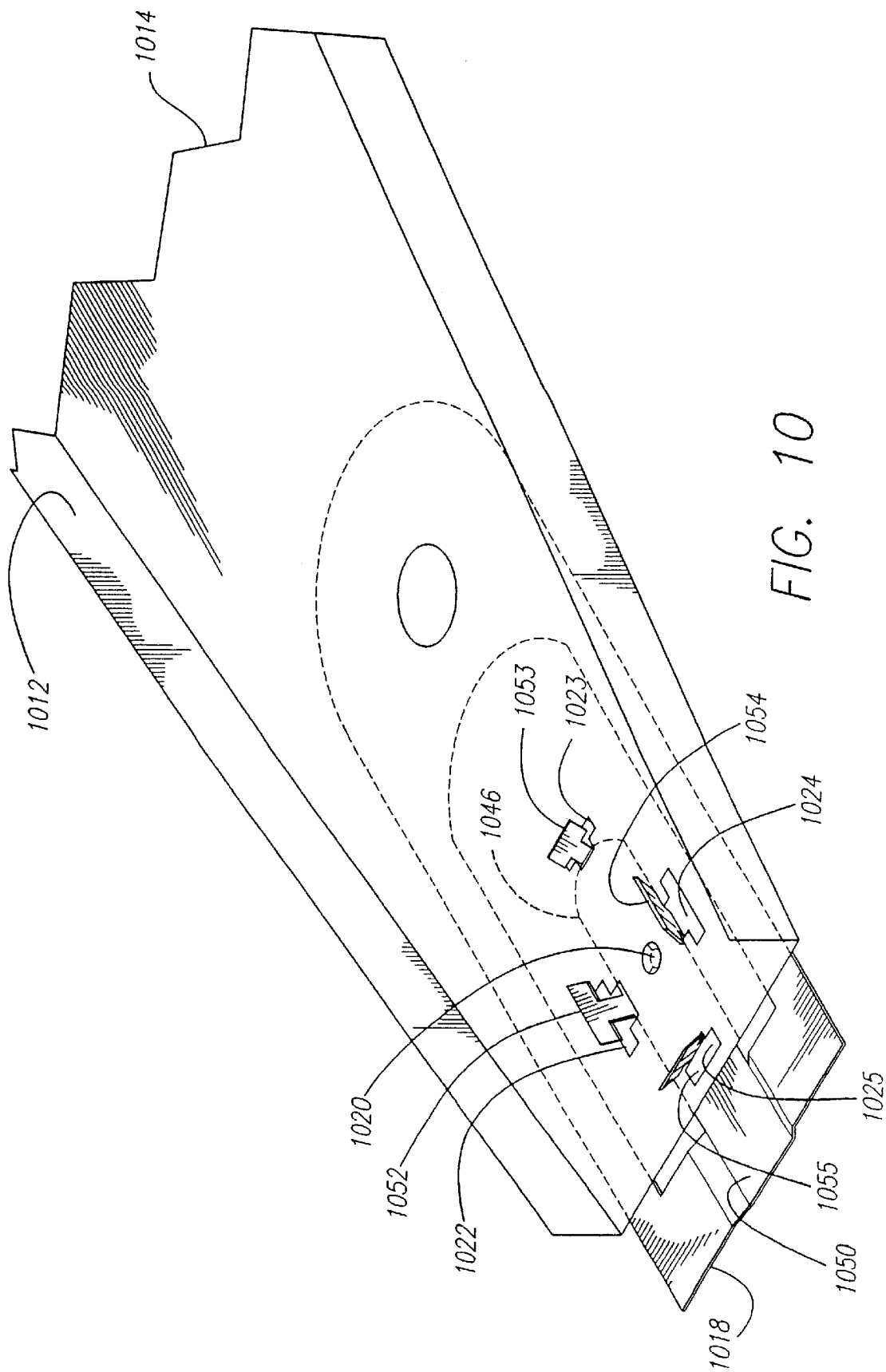
FIG. 10 is an isometric view of a further alternate form of the invention.

In FIG. 10, in which like parts have like numerals to the earlier Figures plus 1000, a further embodiment is shown in which the tongue 1046 is provided with a four tabs 1052, 1053, 1054, and 1055 to intersect with slots 1022, 1023, 1024 and 1025. Configuration and operation of these tabs and slots is as described above in connection with the previous Figures. The FIG. 10 embodiment affords multiple points of excursion control, and is unique over all other limiters in that respect. This advantage flows from the snap-in aspect of the present limiter, which, by eliminating the need for relative longitudinal motion to engage the limiter in the load beam, enable the location of limiter tabs at longitudinally opposed locations, as well as laterally opposed locations, as shown.

The invention method of assembling a suspension assembly 10 thus includes juxtaposing load beam 14 and flexure 12 comprising frame 42 and tongue 46, and carrying on the flexure tongue a limiter structure comprising a tab 52 having an inner end 49 attached to the flexure tongue and an outer end head portion 55 spaced from said inner end at a distance giving the limiter tab a predefined height. The limiter tab head 55 includes a laterally extended portion to one side having an inner edge opposed to the load beam 14. The method includes maintaining the limiter tab in a normally upright position at a predetermined angular orientation of about 78 degrees or between 68 and 88 degrees relative to the flexure tongue, defining a limiter tab head-passing opening or slot 22 in the load beam offset or out of registration with the limiter tab in its predetermined angular orientation and of a shape in the plane of the load beam 14 generally congruent with the limiter tab head and laterally extended to one side, and pressing the flexure and the load beam together at a spacing less than the limiter predefined height, so as to deflect the limiter from its predetermined angular orientation to a smaller angle relative to the flexure tongue 12. The limiter tab head 55 while deflected passes through the load beam slot 22 and then returns to its normal upright position to selectively hook said limiter tab 52 with the edge margin 34 of the load beam slot opening 22 in response to travel of the flexure tongue.

The invention, therefore, provides an improved limiter in a disk drive assembly that is readily assembled by merely pressing together of the load beam and flexure wherein their relatively offset, but cooperating tab and slot structure defines the limiter. The invention further forms a flexure or load beam having a normally upright, resilient limiter structure that is deflectable, forming then on the load beam or flexure to a limiter structure receiving slot that is offset from the normally upright limiter structure, but that receives the limiter structure upon deflection of the structure as by the load beam closing on the flexure, the slot offset causing the received limiter structure to engage the slot edge margin when upright, or nondeflected, the resilience of the limiter structure enabling a snapback of the limiter structure to its normal upright orientation, in which orientation the limiter structure cannot escape the slot.

The foregoing objects of the invention are thus met.

I claim:

1. A snap-fit disk drive suspension comprising a load beam and a flexure secured to said load beam, said flexure having a cantilevered tongue adapted to carry a slider, and a limiter comprising a tab projecting from said flexure tongue and an opposing cooperating slot structure defined by said load beam to limit excursions of said tongue relative to said load beam, said limiter tab being offset from said slot and adapted when deflected to snap into said slot in tongue excursion limiting relation without relative axial displacement of said load beam and flexure.

2. A snap-fit disk drive suspension comprising a load beam and a flexure secured to said load beam, said flexure having a tongue opposing said load beam and adapted to carry a slider, a limiter comprising a cooperating slot and tab structure, said structure including the tab carried by said flexure tongue and the slot in said load beam, said structure limiting excursions of said tongue relative to said load beam, said tab being offset from said slot said tab being adapted when deflected to snap into said slot in tongue excursion limiting relation without relative axial displacement of said load beam and flexure.

3. The snap-fit disk drive suspension according to claim 2, in which said tab returns to an undeflected condition upon being received in said slot.

4. The snap-fit disk drive suspension according to claim 2, in which said tab extends from said tongue, said tab being sufficiently resilient to snap to its said undeflected condition upon reception in said slot.

5. The snap-fit disk drive suspension according to claim 2, in which said tongue has a plurality of said tabs, said load beam having a slot for each said tab.

6. The snap-fit disk drive suspension according to claim 2, in which said load beam and flexure each comprise spring steel.

7. The snap-fit disk drive suspension according to claim 2, in which said flexure, flexure tongue and limiter structure are integrally formed with each other from a common piece of spring steel.

8. The snap-fit disk drive suspension according to claim 2, in which said flexure tongue carries a pair of said tabs, said load beam defining a pair of said openings respectively offset from said tabs and arranged to receive said pair of tabs in flexure tongue travel excursion limiting relation.

9. The snap-fit disk drive suspension according to claim 2, in which said flexure tongue has a fixed proximate end and a free distal end, said tab being fixed to said flexure tongue to extend from its said distal end.

10. The snap-fit disk drive suspension according to claim 2, in which said flexure tongue carries a pair of said tabs, and said load beam defines a pair of said openings.

11. The snap-fit disk drive suspension according to claim 10, in which said limiter structures in said pair are opposed across a portion of said flexure tongue.

12. A snap-fit disk drive suspension comprising a load beam and a flexure secured to said load beam, said flexure having a tongue opposing said load beam and adapted to carry a slider, a limiter comprising a cooperating slot and tab structure defined on said flexure tongue and load beam to limit excursions of said tongue relative to said load beam, said limiter comprising a tab offset from said slot, said tab being adapted when deflected to snap into said slot in tongue excursion limiting relation without relative axial displacement of said load beam and flexure, said slot having an edge margin, said tab being deflectable by engagement with said slot edge margin, said slot being arranged to receive said tab in its deflected condition and to retain said tab in its undeflected condition, said tab resiliently returning to its said undeflected condition upon being received in said slot, whereby excursions of said tongue from said load beam are limited by the engagement of said tab with said load beam.

13. A snap-fit disk drive suspension comprising a load beam and a flexure secured to said load beam, said flexure having a tongue opposing said load beam and adapted to carry a slider, a limiter comprising cooperating slot and tab structures including a plurality of tabs extending from said tongue and a slot for each tab defined by said load beam to limit excursions of said tongue relative to said load beam, said limiter tabs being offset from their respective slots, said tabs being adapted when deflected to snap into their respective slots, each said slot having an edge margin, each said tab being deflectable by engagement with its respective said slot edge margin, said slots being arranged to receive said tabs in their deflected condition and to retain said tabs in their normally upright condition, said tabs resiliently returning to their said upright condition upon being received in said slots, whereby excursions of said tongue from said load beam are limited by the engagement of said tabs with said load beam slots.

14. A snap-fit disk drive suspension comprising a load beam and a flexure, said flexure having a tongue, said flexure tongue being limited to a predetermined travel excursion relative to said load beam by a limiter structure disposed at an angle relative to said flexure, said limiter structure being fixed to said flexure and having a free outer end deflectable relative to said inner end between undeflected and deflected conditions, said load beam having an opening arranged to pass said limiter structure outer end through said load beam in its deflected but not its undeflected condition, said load beam opening having a surrounding edge margin, said limiter structure being resilient to return to its said undeflected condition upon passage of its said outer end through said load beam opening, said limiter structure outer end being shaped to engage said load beam opening edge margin in the undeflected condition of said limiter structure outer end responsive to said predetermined travel excursion of said flexure tongue.

15. A snap-fit disk drive suspension comprising a load beam and a flexure, said flexure having a tongue, said flexure tongue being limited to a predetermined travel excursion relative to said load beam by a limiter structure fixed to said flexure tongue and having an inner end and a hook-shaped free outer end deflectable relative to said inner end between undeflected and deflected conditions, said load beam having an opening arranged to pass said limiter structure outer end through said load beam in its deflected but not its undeflected condition, said load beam opening having a surrounding edge margin, said limiter structure being resilient to return to its said undetected condition upon passage of its said outer end through said load beam opening, said limiter structure outer end being shaped to engage said load beam opening edge margin in the undeflected condition of said limiter structure outer end responsive to said predetermined travel excursion of said flexure tongue.

16. A snap-fit disk drive suspension comprising a load beam and a flexure tongue, said flexure tongue being limited to a predetermined travel excursion relative to said load beam by a limiter structure, said limiter structure having an inner end and being fixed to said flexure tongue and a T-shaped free outer end deflectable relative to said inner end between undeflected and deflected conditions, said load beam having an opening arranged to pass said limiter structure outer end through said load beam in its deflected but not its undeflected condition, said load beam opening having a surrounding edge margin, said limiter structure being resilient to return to its said undeflected condition upon passage of its said outer end through said load beam opening, said limiter structure outer end being shaped to engage said load beam opening edge margin in the undeflected condition of said limiter structure outer end responsive to said predetermined travel excursion of said flexure tongue.

17. A snap-it disk drive suspension comprising a load beam and a flexure, said flexure having a tongue, said flexure tongue being limited to a predetermined travel excursion relative to said load beam by a limiter structure disposed at an angle relative to said flexure, said limiter structure being fixed to said flexure and having a free outer end deflectable between undeflected and deflected conditions, said load beam having an opening arranged to pass said limiter structure outer end through said load beam in its deflected but not its undeflected condition, said load beam opening having a surrounding edge margin, said limiter structure being resilient to return to its said undeflected condition upon passage of its said outer end through said load beam opening, said limiter structure outer end being shaped to overlie said load beam opening edge margin in the undeflected condition of said limiter structure outer end and block greater than said predetermined travel excursion of said flexure tongue.

18. The snap-fit disk drive suspension according to claim 17, in which said limiter structure is hook shaped to overlie said edge margins.

19. The snap-fit disk drive suspension according to claim 17, in which said limiter structure is T-shaped to overlie said edge margins.

20. The snap-fit disk drive suspension according to claim 17, in which said limiter structure is a distal limiter structure on said tongue, and including also second and third limiter structures laterally disposed on said tongue, and at said tongue proximate end a fourth limiter structure, said load beam defining further slots offset relative to said second third and fourth limiter structures for passage of said limiter structure only in its deflected condition.

21. A snap-fit disk drive suspension comprising axially aligned a load beam and a flexure attached to said load beam, said flexure having a tongue extending in load beam attachment free relation, said flexure tongue being limited to a predetermined travel excursion relative to said load beam by a limiter structure fixed to said flexure tongue and having an inner end and a free outer end deflectable between undeflected and deflected conditions, said load beam having an opening offset from said limiter structure inner end, said load beam opening having a surrounding edge margin, said limiter structure resiliently returning to its said undeflected condition upon passage of its said outer end through said load beam opening, said limiter structure outer end being shaped to pass said load beam opening in the deflected condition of said limiter structure outer end and to engage said load beam edge margin left and right of said load beam opening in the undeflected condition of said limiter structure outer end.

22. A snap-fit disk drive suspension comprising a load beam and a flexure having a flexure tongue, said flexure tongue having a distal end and a limiter structure generally parallel with the longitudinal axis of said flexure tongue and adapted to be deflectively sprung relative to said flexure tongue responsive to bodily contact with said load beam, said load beam defining an opening offset from said limiter structure distal end and arranged to receive said limiter structure deflectively sprung and to permit return of said distal end to its undeflected condition in flexure tongue travel excursion limiting relation.

23. The snap-fit disk drive suspension according to claim 22, in which said flexure tongue has a proximate end fixed to said flexure and its said distal end free of connection to said flexure.

24. The snap-fit disk drive suspension according to claim 22, in which said limiter structure is generally hook shaped.

25. The snap-fit disk drive suspension according to claim 22, in which said generally T-shaped.

26. A snap-fit disk drive suspension comprising a load beam, a cantilevered flexure tongue, and a limiter structure fixed to said flexure tongue to be generally parallel with the longitudinal axis of said flexure tongue and adapted to be defectively sprung relative to said flexure tongue responsive to bodily contact with said load beam, said load beam defining an opening offset from said limiter structure distal end and arranged to receive said limiter structure deflectively sprung and to permit return of said distal end to its undeflected condition in flexure tongue travel excursion limiting relation, said load beam defining said offset opening relative to distal end fixed limiter structure.

27. A flexure for a disk drive suspension comprising a frame and a cantilevered tongue having a resilient tab extending at an angle relative to said tongue such that said tab deflects in the direction of said angle when pressed toward said tongue, said tab having a T-shaped free end to snap-fit into an offset opening in an opposing load beam when deflected, and when no longer deflected return to its said angle in tongue travel limiting relation relative to said frame.

28. The flexure according to claim 27, in which said tab is sized to extend through said load beam opening, said tab T-shaped free end being sized to overlie left and right edge margins of said load beam opening in flexure excursion limiting relation.

29. A snap-fit disk drive suspension comprising a flexure having a cantilevered tongue adapted to carry a slider and a limiter tab in angled relation to said tongue and an opposing cooperating slot structure defined by said suspension, said limiter tab being offset from said slot and adapted when deflected from its said angled relation by said suspension to snap into said slot in tongue excursion limiting relation without relative axial displacement of said suspension and flexure.

30. A method of assembling a suspension including juxtaposing a load beam and a flexure tongue, carrying on said flexure tongue a limiter having an outer end and attached at a first slant angle to said flexure tongue to give said limiter a predefined height, forming on said limiter outer end an enlarged head opposed to said load beam, defining a limiter enlarged head, pressing opening in said load beam normally out of registration with said limiter and of a shape in the plane of said load beam to pass said limiter enlarged head, pressing said flexure tongue and said load beam together at a spacing less than said limiter predefined height, deflecting said limiter in passing to said load beam from its said first slant angle to a smaller angle relative to said flexure tongue, passing said limiter enlarged head through said load beam at said load beam opening and returning said limiter to a position to selectively engage said limiter enlarged head with said edge margin of said load beam opening in response to travel of said flexure tongue.

31. The method according to claim 30, including also maintaining said limiter at a slant angle of between about 68 and 88 degrees relative to said flexure tongue before and after passing through said load beam opening.

* * * * *